March 13, 1962 H. G. LINDNER 3,025,350

SECURITY COMMUNICATION SYSTEM

Filed June 5, 1957

8 Sheets-Sheet 1

INVENTOR.
HERBERT G. LINDNER

BY

Harry M. Saragovitz
ATTORNEY

March 13, 1962 H. G. LINDNER 3,025,350

SECURITY COMMUNICATION SYSTEM

Filed June 5, 1957

8 Sheets-Sheet 2

INVENTOR,
HERBERT G. LINDNER

BY Harry M. Saragovitz

ATTORNEY.

March 13, 1962 H. G. LINDNER 3,025,350

SECURITY COMMUNICATION SYSTEM

Filed June 5, 1957 8 Sheets-Sheet 3

INVENTOR,
HERBERT G. LINDNER
BY
Harry M. Saragovitz
ATTORNEY.

March 13, 1962 H. G. LINDNER 3,025,350

SECURITY COMMUNICATION SYSTEM

Filed June 5, 1957 8 Sheets-Sheet 4

INVENTOR,
HERBERT G. LINDNER
BY
Harry M. Saragovitz
ATTORNEY.

INVENTOR,
HERBERT G. LINDNER
BY
Harry M. Saragovitz
ATTORNEY

INVENTOR,
HERBERT G. LINDNER
BY
Harry M. Saragovitz
ATTORNEY.

INVENTOR,
HERBERT G. LINDNER
BY
Harry M. Saragovitz
ATTORNEY.

March 13, 1962 H. G. LINDNER 3,025,350

SECURITY COMMUNICATION SYSTEM

Filed June 5, 1957 8 Sheets-Sheet 8

INVENTOR,
HERBERT G. LINDNER

BY Harry M. Saragovitz
ATTORNEY.

3,025,350

SECURITY COMMUNICATION SYSTEM

Herbert G. Lindner, Red Bank, N.J., assignor to the United States of America as represented by the Secretary of the Army Filed June 5, 1957, Ser. No. 664,883
4 Claims. (Cl. 179—1.5)
(Granted under Title 35, U.S. Code (1952), sec. 266)

The invention described herein may be manufactured and used by or for the Government for governmental purposes, without the payment of any royalty thereon.

This invention relates to a communication security method and system for transmitting information through any type of communication channel subject to possible eavesdropping and jamming. The use of multiplex transmission of messages is now well known in the art as more fully discussed in my prior application Serial No. 580,158, filed Apr. 16, 1956, for "Communication Security Method and System" and to some extent also in Serial No. 590,999, filed June 12, 1956, for "Synchronization for Maximum Correlation" and Serial No. 620,776, filed Nov. 6, 1956, for "Security Remote Control Method and System."

In one form of such multiplex transmission known as time multiplex several messages are transmitted over a signalling system by sequential selection of successive samples of each message, all transmitted according to a simple prearranged sequence and provided with a special synchronizing signal in one of the sequential intervals. When the combined signals are received they are separated into the various individual messages by a distributor synchronized to the selector used in the transmitter. A particularly common form of time multiplex is known as pulse code modulation in which the existence or nonexistence of pulses at prearranged times is indicative of the magnitude of the information signal being transmitted. The arrangement of the prescheduled pulsed intervals is normally based on a binary system and if the least significant digit of each group is transmitted first a very simple decoder may be used in which each digit pulse is stored, but attenuated at such rate as to reach one half its value by the time of occurrence of the next pulse, one fourth at the second, etc. Such systems are reasonably secure against casual eaves-dropping by ordinary receiving circuits. However, anyone sufficiently interested in making a detailed analysis of the combined signals can determine the necessary characteristics for designing a receiving circuit which will obtain the information.

In the present invention the coding is not in simple binary form but is based on a plurality of mutually orthogonal functions apparently resembling noise, and furthermore the sequential samples may be transmitted by suppressed carrier modulation of a plurality of carriers as in the above identified application Serial No. 580,158. The sampling technique, commonly used first for selecting code groups representing amplitude of samples and secondly for multiplexing samples of several signals onto a single carrier channel is here used secondly for distributing samples of a single signal onto several carrier channels. In the receiver available carriers and orthogonal noise functions are identified in the incoming signal by suitable circuitry to establish the amplitude values of the successive samples of the information signal. From these samples the actual information wave can be reconstructed in the receiver thereby completing the purpose of the system.

In one form of receiver the incoming signal is modulated by the various orthogonal noise functions, thereby restoring any carrier which had been modulated by the corresponding noise function in the transmitter. The existence of this carrier may then be determined in a very narrow band filter to identify the particular information sample in time and amplitude level. In another form of the receiver the incoming signal is modulated by the carrier thereby restoring the noise function. Such a noise function can be readily identified in the receiver by a suitable matched filter network designed to provide a substantial output upon the occurrence of the corresponding noise function. Such a filter would be designed to have a unit impulse response which is the time inverse of the particular noise function to be identified. However, there is one additional problem in that the reinserted carrier must be exactly in phase with the original carrier from the transmitting station including any transmission delays which may have affected the phase of arrival of the incoming signal. One possible solution of this problem is to provide highly stable carrier generators at transmitter and receiver and then synchronize the receiver carrier by the received signal. The suppressed carrier modulation in the transmitter eliminates the actual carrier and substitutes only pairs of sidebands, which jointly equal the product of the actual carrier times the (A.C.) modulation and therefore appear on casual examination to involve the actual carrier; closer analysis reveals that the phase of this wave is reversed substantially half the time relative to the actual carrier and is merely an "apparent" carrier in the transmitted wave. Assuming only a single frequency modulation there would be sidebands of only two frequencies, which cancel to provide the nulls and add to provide the maxima of the joint wave, successive maxima being of opposite phase relative to the actual carrier. The overall effect is the same with a complex modulation, but sidebands would also be complex. After full wave rectifying the received signal, the frequency of the apparent carrier is doubled and the phase reversal has no further significance. Although the rectification eliminates any significance in the phase reversals, small changes in phase due to transmission delays also appear in the double frequency wave.

The synchronization can then be controlled by either doubling the receiver carrier generator frequency or halving the new frequency obtained by full wave rectification to provide two signals of similar frequency suitable for phase lock control. Such phase lock is commonly accomplished by a phase comparator circuit connected to a reactance tube network to modify the receiver carrier generator frequency enough to correct any lack of synchronism. It will be recognized that in both cases there is some need for synchronization in the receiver either of the noise functions or the high frequency carrier generator.

The term "modulation" has commonly been used to indicate phase or frequency variation as well as suppressed carrier or the common amplitude modulation and a wide variety of similar techniques. It is recognized mathematically that the desired output voltage $e_0$ involves the product of a carrier input voltage $E_c \sin W_c t$ times a signal input voltage $E_s \sin W_s t$ (usually a complex wave, not essential to analysis); frequently modulation output also involves additional components (or deletes portions of this product) either intentionally or because of the nature of the apparatus. In the present system proper operation depends on the product without such additions or deletions; a modulator of this type is distinguished by the term "multiplier." In the case of common amplitude modulation a D.C. bias voltage equal to the maximum $E_s$ is desirable because of the properties of the modulator circuit and also to provide the desired output in which the varying carrier never reverses thru zero value, thus:

$$e_0 = E_s(1 + \sin W_s t) E_c \sin W_c t \quad (1)$$

$$e_0 / E_s E_c = \sin W_c t + \sin W_c t \sin W_s t \quad (2)$$

The term of Equation 2 involving a product of two sines may be recognized by trigonometry to indicate that this product actually involves new components at the sum and difference frequencies, since:

(3) $2 \sin W_c t \sin W_s t = \cos (W_c - W_s)t - \cos (W_c + W_s)t$

A typical circuit most readily analyzed is the screen grid modulator (FIG. 15–8, p. 535, Electronic and Radio Engineering, F. E. Terman, 4th edition, 1955, McGraw-Hill) in which the signal and carrier are effectively added in the tube output, but tube non-linearity also produces strong product components near the carrier frequency, and signal components are so remote from the others in frequency that they are eliminated by the filtering effect of the output circuit, leaving the waves of Equations 1 or 2.

In suppressed carrier modulation the carrier term is also to be eliminated; since filtering so near the desired product components is difficult a pair of modulator circuits may be arranged to balance out the carrier and may rely on filtering as above to eliminate signal (FIG. 15–13(*a*), p. 540, Terman), or may also balance out the signal (FIG. 15–13(*b*), Terman). Since in a true multiplier only the new components are desired, and may overlap the frequency range of signal and carrier, preventing effective filtering, only such balancing out of both signal and carrier is suitable in some applications. The portion of Equation 1, $E_s(1+ \sin W_s t)$, identifies the envelope (reflected about the axis) of the varying carrier wave, with a balanced modulator this portion reduces to $E_s \sin W_s t$ crossing the axis, and therefore its own reflection about the axis, to represent a phase reversal of the varying carrier wave. The most helpful viewpoint in analyzing a wave frequently depends on the purpose; a varying carrier of amplitude identified by an envelope (the product of two sine functions) provides a simple mental picture, but to determine the effect of a filter circuit on such a wave usually requires a separate consideration of any carrier not suppressed and the two sidebands (the cosine functions of sum and difference frequencies). In a single sideband modulator the sum (or difference) frequency component is also eliminated, in one of several ways (p. 541–3, Terman), leaving less than the product of carrier and signal.

The adding of modulation inputs in a non-linear circuit to give product components involving sum (or difference) frequencies and often eliminating the inputs from the output is inherently confusing. The use of the term "multiplier" to identify a particular form of modulator cannot be completely simple but is not nearly as complex as the modulation itself. The term "mixer," even broader than "modulator," is often used when the product components are of no interest, contrary to the present situation wherein only the product components are desired.

This invention might be briefly described as a code modulation system for a single information wave, in a typical example of which: successive information samples in time of each sample group are identified in time by particular carriers, which actually are suppressed in balanced modulators, transmitting only the side bands; and various quantized amplitude levels are identified by particular modulating codes, which are mutually orthogonal wide band prescheduled functions resembling noise. The successive samples may be stored to a common starting time or may be used as soon as generated. A practical system would use electronic components, and might include:

A. Several (5) conventional balanced modulators (AI to AV) supplied by suitable different carriers, and by signal functions (B below) controlled by gates (F below).

B. Several (32) sources of mutually "orthogonal" noise functions $N_a$ to $N_{ff}$.

C. A timer, such as a sequential switch, having (5) output leads successively energized by signal pulses corresponding to the number of modulators and carriers, so that each output lead provides timing pulses for sampling information to be transmitted over a corresponding balanced modulator supplied by a particular carrier.

D. An amplitude quantizer for the input information having (32) output leads corresponding to the number of noise functions (B above), so that each output lead provides for selection of a corresponding noise function (identifying the corresponding amplitude) to be applied to the balanced modulator; the amplitude quantizer itself merely follows variations of amplitude as they occur without any time quantizing (sampling).

E. The time amplitude quantizer and hold circuits (5 groups of 32) controlled by the timer (C) to time quantize the output of amplitude quantizer (D) and hold each resultant until the next time interval so that the varying outputs of the amplitude quantizer are also time quantized (or sampled) at the instants established by the timer (excluding any other outputs which may have existed between such instants).

F. Orthogonal function gate circuits (5 groups of 32) controlled by the time amplitude quantizer (EI to EV) to apply the proper noise functions to the proper modulators.

G. Storing circuits (5 groups of 32), to be used if samples are to be stored to a common starting time, under control of the last timer output lead. The last three components, E, F, and G, have equal numbers of corresponding elements and have been grouped under the name "encoders" with numerals I to V.

The object of this invention is to provide a fairly simple system for the transmission of the desired message and yet have the combined signal available to jamming or eaves-dropping in such a complex form that jamming or analysis and reconstruction of the message to be secured will be entirely impossible, or at least so difficult that the message can be considered entirely secure for all practical purposes.

Further objects of the invention will become apparent in the following description of the invention in connection with the accompanying drawings, in which.

Figure 8:
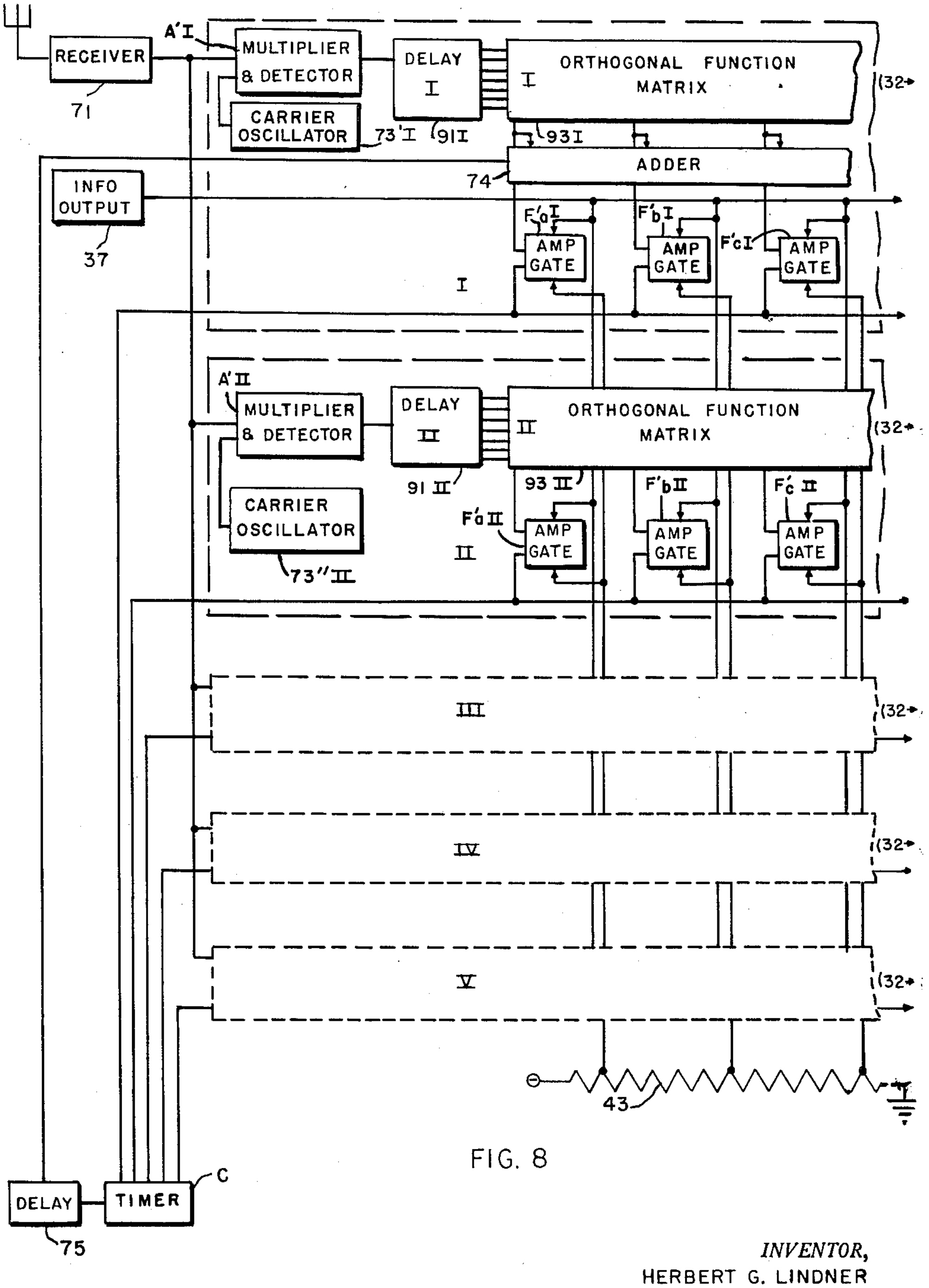
FIG. 8 illustrates a somewhat different receiver system also suitable for practicing the invention.
Figure 9:
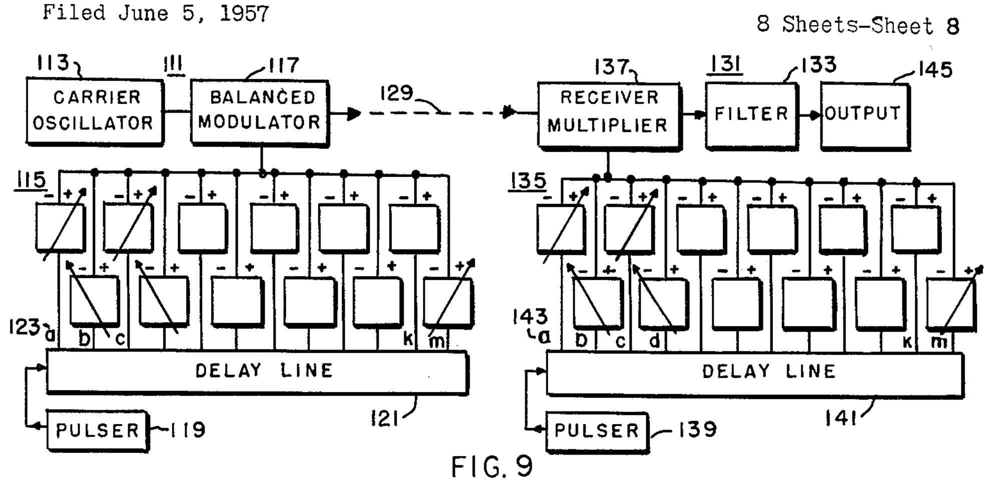

FIG. 9 with modifications A and B illustrates circuitry analogous to FIG. 8, used for analysis of the operation.

Figure 1:
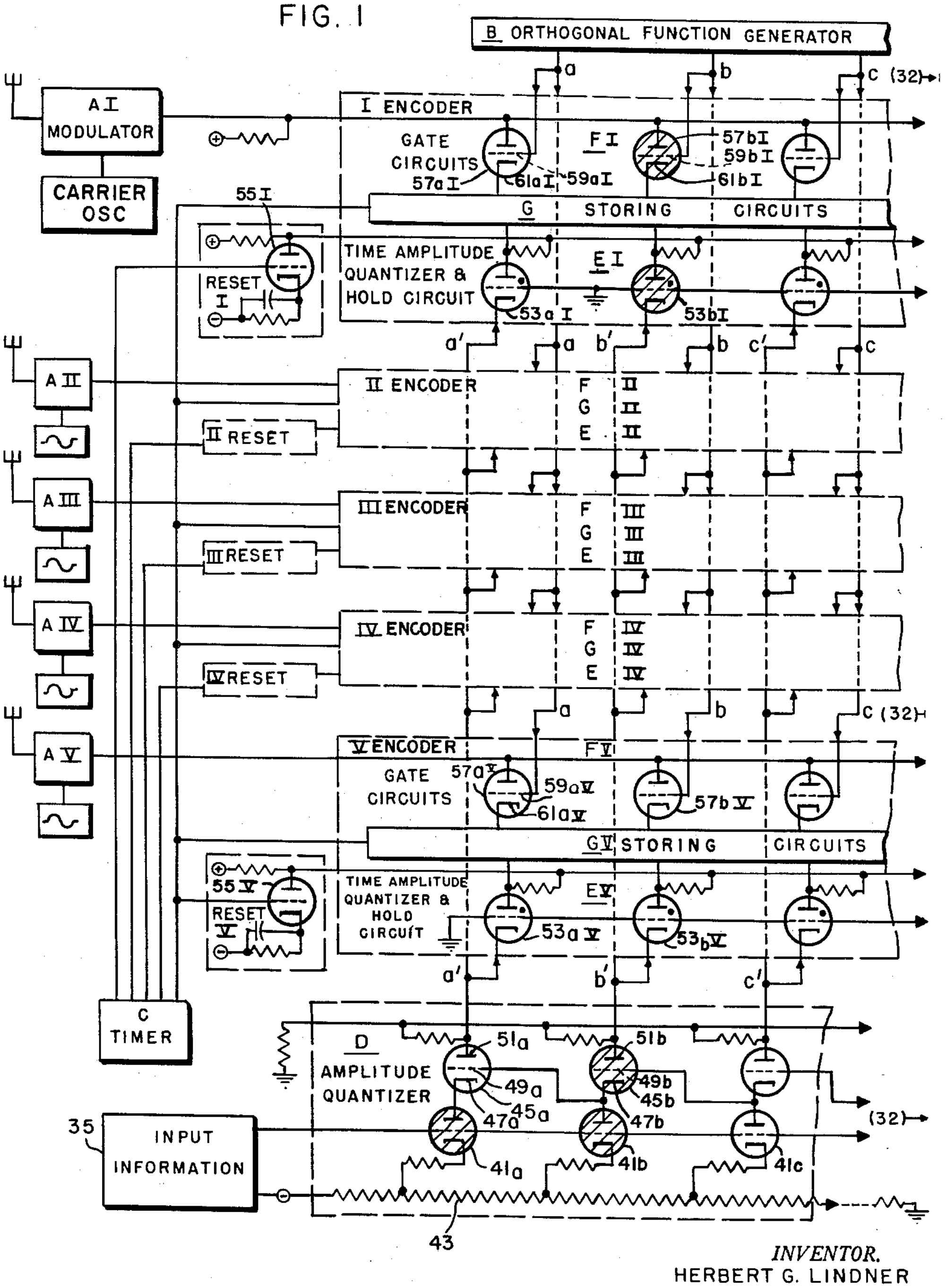
FIG. 1 illustrates, in somewhat over-simplified form, a suitable transmitter system for practicing the invention.

FIG. 1 may be considered somewhat in the nature of a block diagram and is intended only for illustration of the operation desired, not as an actual circuit, since practical requirements may somewhat increase the complexity of the system. The following discussion of FIG. 1 must be considered from this standpoint.

The input information source 35 is connected to amplitude quantizer (D) which includes a plurality of (32) quantizing tubes 41*a*, 41*b*, etc. differently biased by voltage divider 43 to conduct at (32) successive voltages, and a plurality of (32) output tubes 45*a*, 45*b*, etc. having their cathodes 47*a*, 47*b*, etc. and grids 49*a*, 49*b*, etc. connected across the plates 51*a*, 51*b*, etc. of successive pairs of the quantizing tubes. A closely similar quantizer device is shown in Gamarekian Patent No. 2,765,405. An alternative quantizer device using a cathode ray tube with multiple output electrodes is illustrated by Clogston Patent No. 2,776,371 issued Jan. 1, 1957 and in prior application Serial No. 580,158. The time amplitude quantizer EI to EV as shown includes several (5) groups each including a plurality of (32) gaseous tubes 53*a*I, 53*b*I, 53*a*V, 53*b*V, etc. in parallel; a reset tube 55I to 55V controlled by the timer (C) momentarily deenergizes the group, the other tubes 53*a*, 53*b*, etc. being responsive to the amplitude quantizer D output at the time immediately after the reset tube completes its function. The various ouputs of timer (C) by means of the tube corresponding to tube 55V in reset V successively deenergize each of the (5) groups. The common plate load resistors from the positive source terminal to each of the reset (vacuum) tubes 55I to V and corresponding groups of gaseous tubes such as 53*a*I, 53*b*I, 53*a*V, etc. provide the necessary voltage drop to deionize the conducting gaseous tube when the reset (vacuum) tube provides a conductive path to the negative source terminal, and a somewhat lesser voltage drop when the reset tube no longer conducts but one of the gaseous tubes has become conductive. Since the amplitude quantizer provides ground potential outputs except on one lead, shown as *b'*, which is somewhat negative, only the corresponding gaseous tube (with grounded grid) has proper main electrode potential and control bias to become ionized when the reset tube stops conducting and reduces the plate potential on other such tubes to prevent their ionization until after the next reset operation. Either before or after the time amplitude quantizer (EI to EV some form of storing circuits GI to GV may be used to store the various sample control signals to operate the tubes 57*a*I, 57*b*I, 57*a*V, 57*b*V, etc. at a common starting time, normally the fifth sample time as determined by the timer; this is not essential to the operation but may assist in avoiding eaves-dropping. It will be apparent in the diagram that the orthogonal functions *a*, *b*, *c*, etc., from generator B are supplied to the various grids 59*a*I, 59*b*I, 59*a*V, 59*b*V, etc. in each of the five gate circuits (thru the upper leads into the time amplitude quantizer and gate blocks), while the corresponding outputs *a'*, *b'*, *c'*, etc. of the amplitude quantizer are also supplied to the various cathodes 61*a*I, 61*b*I, 61*a*V, 61*b*V, in each of the five time amplitude quantizer circuits (the lower leads of the same blocks). The combinations of time amplitude quantizer and hold circuit, storing circuits, and gate circuits are referred to for convenience as encoders I to V corresponding to the five intervals established by the timer C and resets I to V and to the five modulators AI to AV. Such encoders apply the function corresponding to the quantized amplitude to the carrier corresponding to the quantized or sampling time.

The above paragraph involves the concept to "quantize" or represent a continuous analog variable by a discrete digital number of possible unit values (steps or quanta, usually spaced equally or according to a simple mathematical formula) ignoring fractional (intermediate) values; it is common in digital or other coding systems, since a code inherently can represent only a finite number of variations, or in multiplex systems, since several messages must share a channel. In amplitude quantizing, units might be in volts, for example, quanta of one volt, fractional volts being ignored. Units also could be in milliwatts, proportional to square of voltage, or various other conventional or arbitrary values. In time quantizing, often called sampling, units are normally in fractions of seconds, at least two samples per cycle at the highest frequency of interest, values at other than the time of sampling being ignored. In the present system the amplitude quantizing is accomplished first, then the time quantizing; however, since each applies its own limits independently of the other, the overall result would be the same if the other order were followed. The two aspects of quantizing may even appear somewhat inseparable, for example, at the time of reading the units digit in serial reading cathode ray coding tubes (FIG. 7 of article by B. Lippel, pp. 29–37, IRE Transactions on Instrumenation, March, 1958, emphasizing special reading error prevention techniques closely related to the amplitude and somewhat to the time quantizing).

Frequently such amplitude, time, or both increments may be distributed on separate output lines, and the actual amplitude or particular time may be indicated at least partially by the particular line energized rather then the time such line is energized or amplitude thereon. Sometimes more than one line is energized, a number which may be proportional to the value involved, for example: among tubes 41*a*, 41*b*, etc. the amplitude is represented by the number of tubes energized, while among tubes 51*a*, 51*b*, etc. the particular single tube energized represents the same amplitude. Operation on multiple lines, called parallel, or sequentially on one line, called serial, are both involved in various portions of the present system.

To avoid the need for individual numbers on every one of the tubes and other elements in the various types of circuits, those relating to the various carriers (5) are designated by the Roman numerals I to V and those relating to the various amplitudes (32) are designated by lower-case letters *a* to *ff* (actually only a few such as *a*, *b*, and *c* are shown in the drawings). The modulators, timer outputs, and reset circuits need be designated only by Roman numerals, and the orthogonal function outputs and amplitude quantizer circuits need be designated only by lower case letters, while the time amplitude quantizer and hold, storing, and gate circuits must be designated by both.

In the drawing the operation of particular tubes is indicated by a light cross-hatching to illustrate a typical condition of the operation when the input signal voltage is sufficient to operate only the first two of the amplitude quantizer input tubes, 41*a* and *b*. In the first amplitude quantizer output tube 45*a* the grid 49*a* is somewhat negative due to operation of the second input tube 41*b* but the grid 49*b* of the second output tube 45*b* is comparatively positive due to nonoperation of the third input tube 41*c*; therefore only the second output tube 45*b* is operated. This system merely quantizes the amplitude of the input voltage concurrently but without any time quantizing. If the timer C has just completed operation of the reset for the first time and amplitude quantizers, EI the second tube 53*b*I thereof would now be operative, and the second gate tube 57*b*I would also be operative if the storing circuit GI were not in use; if a storing circuit were used the second gate tube 57*b*I would not become operative until operation of the fifth output of timer C.

In brief, the input information amplitude determines continuously what quantizer output would be energized and therefore what corresponding orthogonal function might be applied to the modulators AI to AV to combine with the carriers from their corresponding oscillators and provide the appropriate output to their corresponding antennas. The timer outputs determine, for each of the corresponding carrier modulators, the time at which the quantizer output is to be selected and held for control of the corresponding orthogonal function. The particular orthogonal functions may be utilized for modulation as soon as the corresponding quantizer output is "held" or may be stored until the orthogonal functions for all modulators are ready to change at one time. The nature of suitable orthogonal function generators is discussed below in relation to FIGS. 9, 9A, and 9B.

Figure 2:
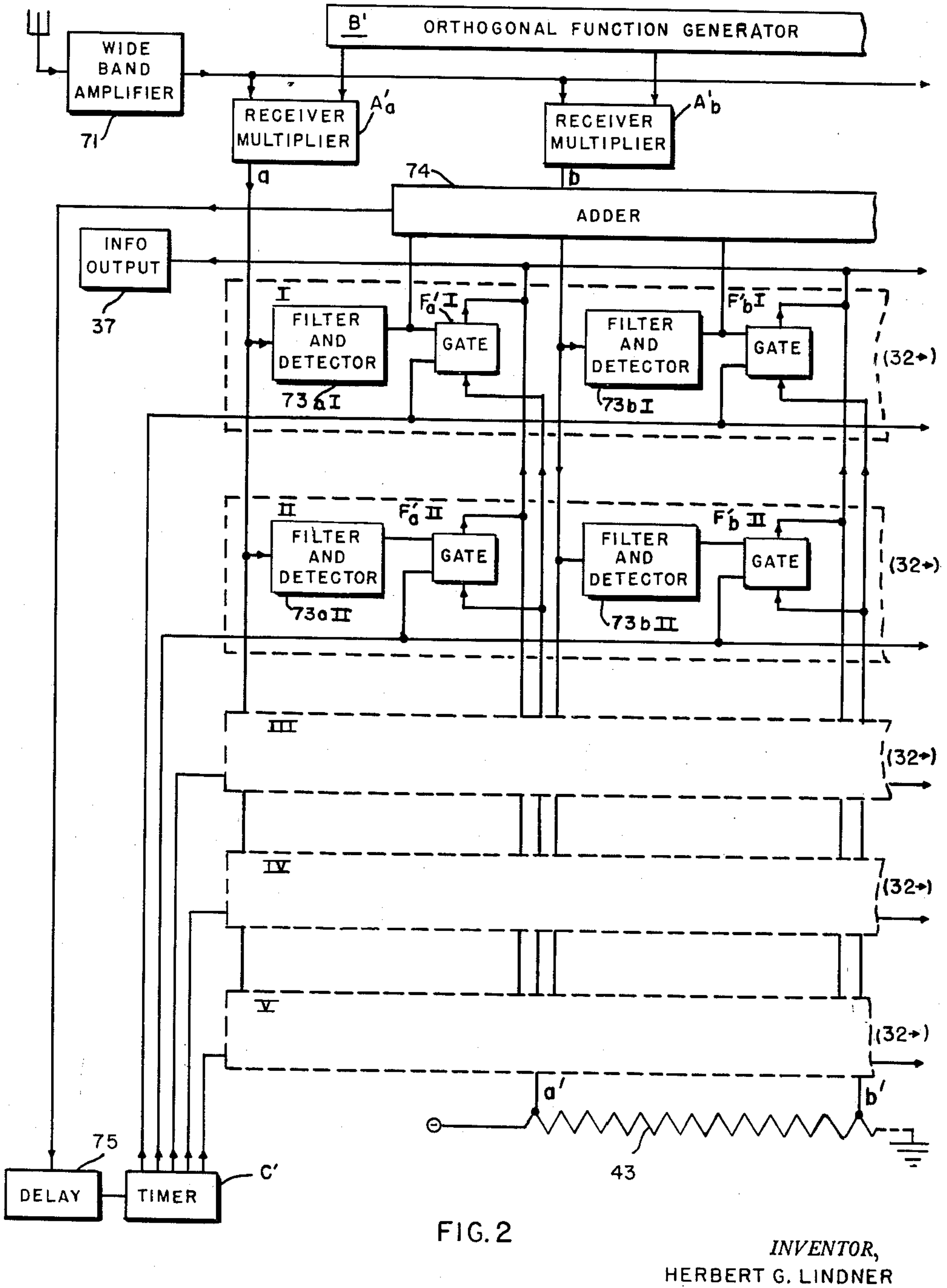
FIG. 2 illustrates a corresponding receiver system.

In the case of the receiving apparatus all of the components are substantially conventional and therefore only a block diagram is considered necessary as indicated in FIG. 2. An orthogonal function generator B' as in FIG. 1 is provided having (32) outputs each of which is supplied to a receiver multiplier A'*a*, A'*b*, etc., having the same properties as a balanced modulator, connected thru a wide band amplifier 71 to the receiving antenna. The output of each of these (32) receiver multipliers is connected to a plurality of filters 73*a*I, 73*b*I, 73*a*II, etc. corresponding to the five carrier frequencies of the transmitting system and in conjunction with a timer input serves to operate a single gate circuit F'*a*I, F'*b*I, F'*a*II, etc. which supplies an appropriate voltage amplitude derived from a voltage divider 43′ to the common information output. In a more complete system each filter would have its own receiver-multiplier instead of one for each group of filters as shown in this figure.

A comparison of the transmitter and receiver systems will indicate that in the receiver the wide band amplifier, receiver multiplier, and filter and detector circuits correspond substantially to the modulators A of the transmitter circuit, the filter and detector portions corresponding to the carrier oscillator inherent in the modulator device of the transmitter system. Also it will be apparent that the gate circuits of the receiver correspond substantially to the time amplitude quantizer and hold circuits of the transmitter system, since they reconvert the decoded data appearing on a plurality of circuits to a single output including the proper sequence of timing of the various signal components. In the transmitter it was necessary to compare the input information with the standard amplitude values as established by the voltage divider but this comparison is unnecessary in the receiver circuits. On the other hand, a comparison between the orthogonal functions as received and those provided by the orthogonal function generator is necessary in the receiver but not in the transmitter.

Figure 7:
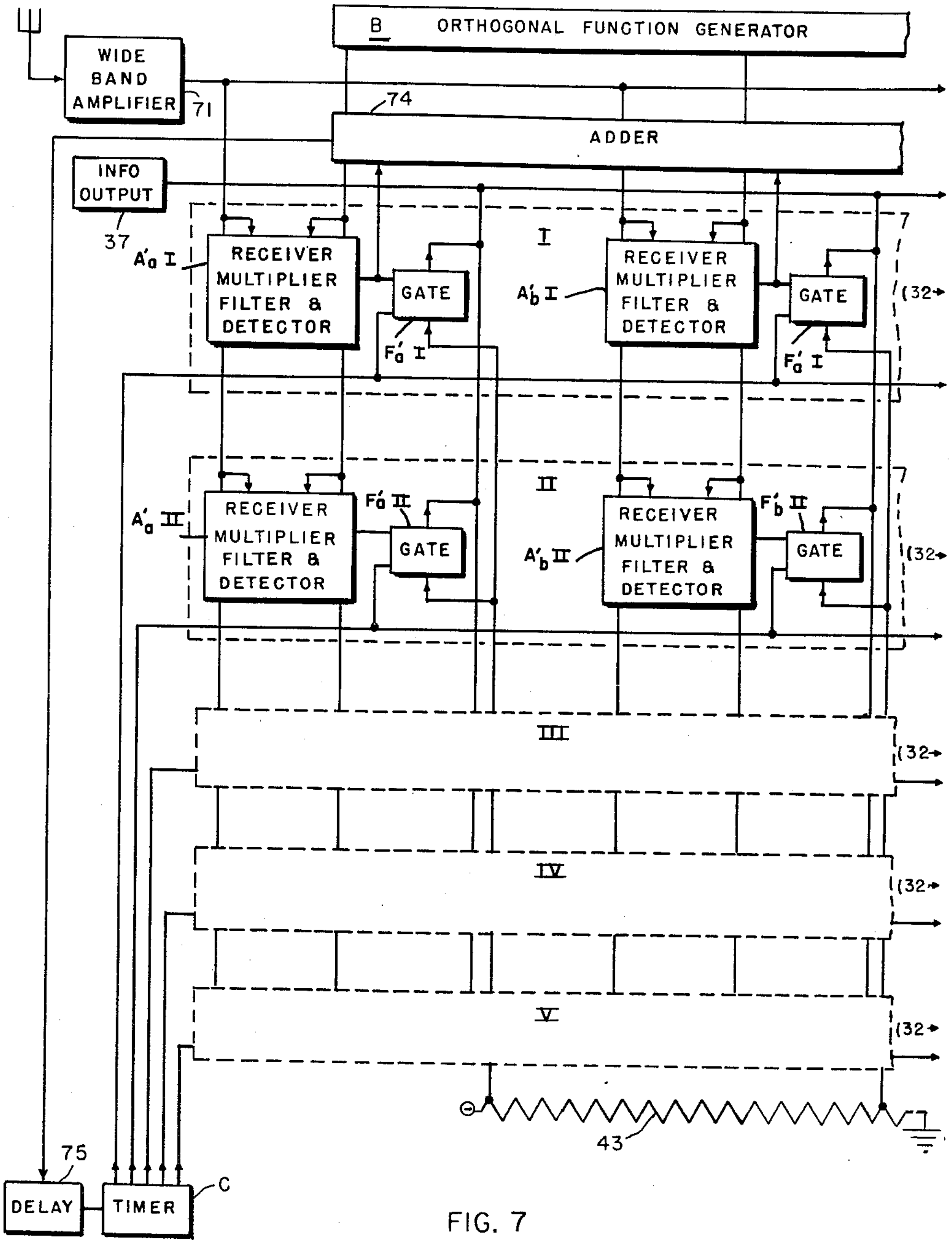
FIG. 7 illustrates a more complete receiver system generally similar to FIG. 2.

It may be noted that in the receiver system of FIG. 2, the organization is not based on a retracing of the steps used in the transmitter system of FIG. 1 since the comparison of the incoming signal with the orthogonal noise function is made first and then the various carriers are identified in the filter systems. However, this order of operations is optional as will be seen later in FIGS. 7 and 8 of which FIG. 8 reinserts the carrier to obtain the orthogonal functions and then identifies such orthogonal functions. FIG. 7 which has separate receiver multipliers for each filter might be considered as identifying the received signals in either order of operation.

Figure 4:
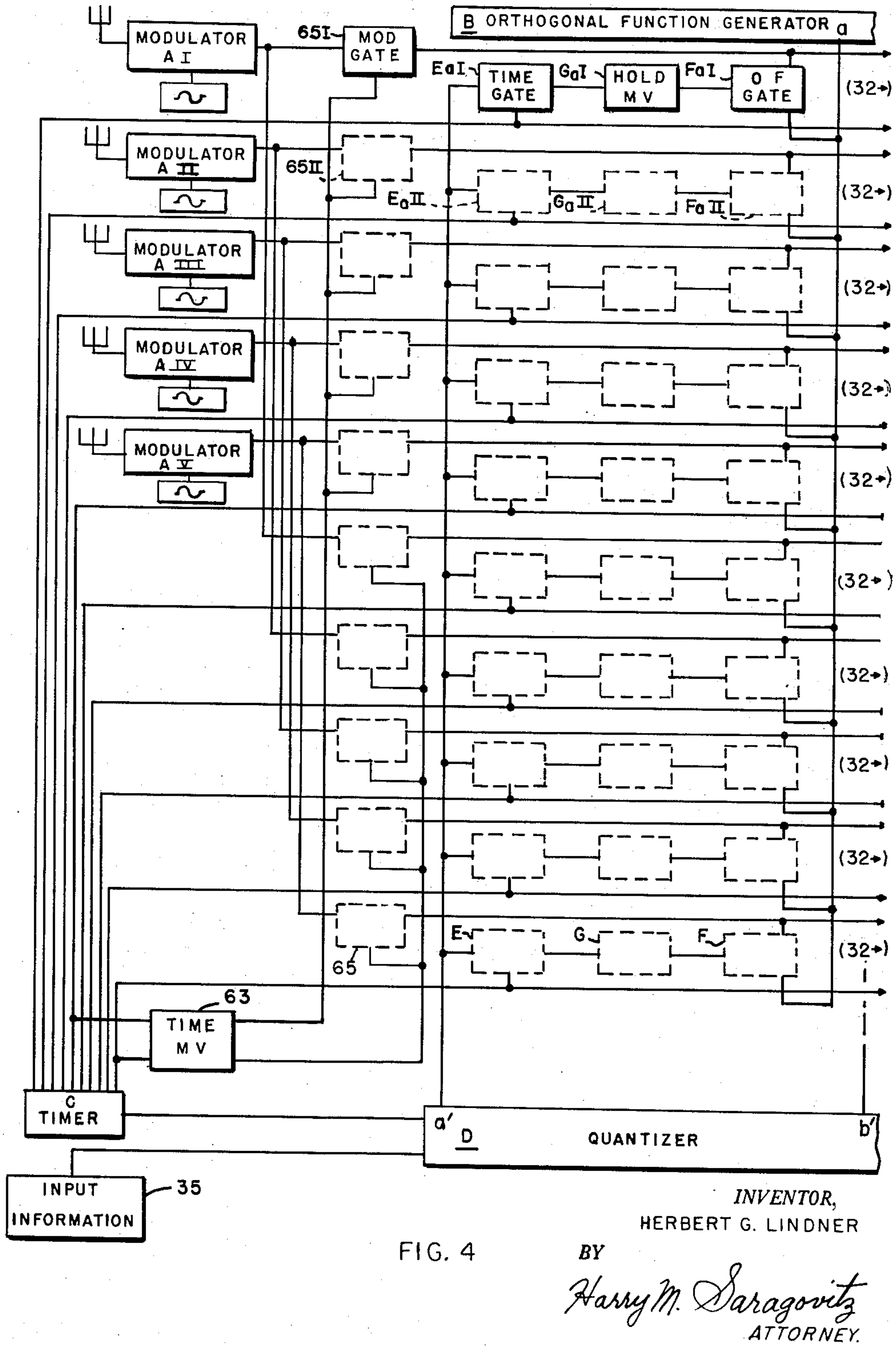
FIG. 4 illustrates another complete transmitter system.

It will be apparent from a review of the operation as described in prior application Serial No. 590,999 that any noise function from generator B modulating a particular carrier in the modulators AI to AV of the transmitter system when supplied to a balanced modulator A′*a*, A′*b*, etc. connected to the corresponding noise function from generator B′ in the receiver circuit will provide an output of substantial amplitude at the frequency corresponding to the carrier in the transmitting circuit. Such carrier would be identified by the appropriate filter 73*a*I, 73*b*I, 73*a*II, etc. and operate the proper gate F′*a*I, F′*b*I, F′*a*II, etc. to apply a voltage pulse, of a magnitude and sign corresponding to the particular orthogonal noise function quantized amplitude level at the transmitter, to the common output circuit of the receiver, which is a low pass filter of cutoff frequency equal to the highest frequency of the sampled speech wave. If the transmitter is arranged to transmit all noise functions over the same interval instead of transmitting them as the samples are taken, in addition to the circuits of FIG. 2 it will be necessary to provide suitable storing circuits in the outputs to the various gates so that the correlation will be effective concurrently with the timer outputs to open the gates at a proper time corresponding to the time at which the particular sample is taken. In order to maintain synchronization between the transmitter and receiver, the outputs from the filters 73*a*I, 73*b*I, etc. corresponding to one carrier frequency are also supplied to an adder circuit 74 which therefore provides a strong signal each time any one of the orthogonal functions transmitted over the carrier I acquires substantial amplitude. The output of the adder circuit is supplied thru a delay means 75 to the controlling timer C. The five successive outputs of the timer C are used as supplemental gating voltages to control the application of the various amplitude level voltages to the output circuit. The required synchronization of generators in transmitters and receivers may be accomplished by any of several previously known techniques, for example: Transmitter and receiver each may include a precision oscillator to control timing circuits thus holding synchronization rather closely even in the absence of any signal. The receiver may also include double correlation detectors responsive to lead or lag of the receiver timing relative to that of the received signal to control the frequency of a variable oscillator. During reception the variable oscillator rather than the precision oscillator may control the timing circuit of the receiver and therefore correct for any drift from synchronization. An elementary embodiment is shown in FIG. 4 of application Serial No. 580,158. The synchronization of the orthogonal function generators, altho much more complex, is somewhat analogous to the synchronization of various systems such as pulse coding (1) of the simple logical binary counting form used for transmitting amplitude modulated voice waves or (2) of the arbitrary permutation form used for transmitting teletype data. By adjusting the relative phase positions of incoming signals and the receiver decoder the decoded material soon makes sense; at this point the periodicity of the incoming signal is applied through a phase control circuit to retain the desired phase. In the case of synchronizing to complex noise-like orthogonal functions the receiver is necessarily more complicated and also requires more time to reach synchronism. The great variety of signal forms so thoroughly obscures the nature of the signal that the possibility of interception is infinitessimal.

Figure 3:
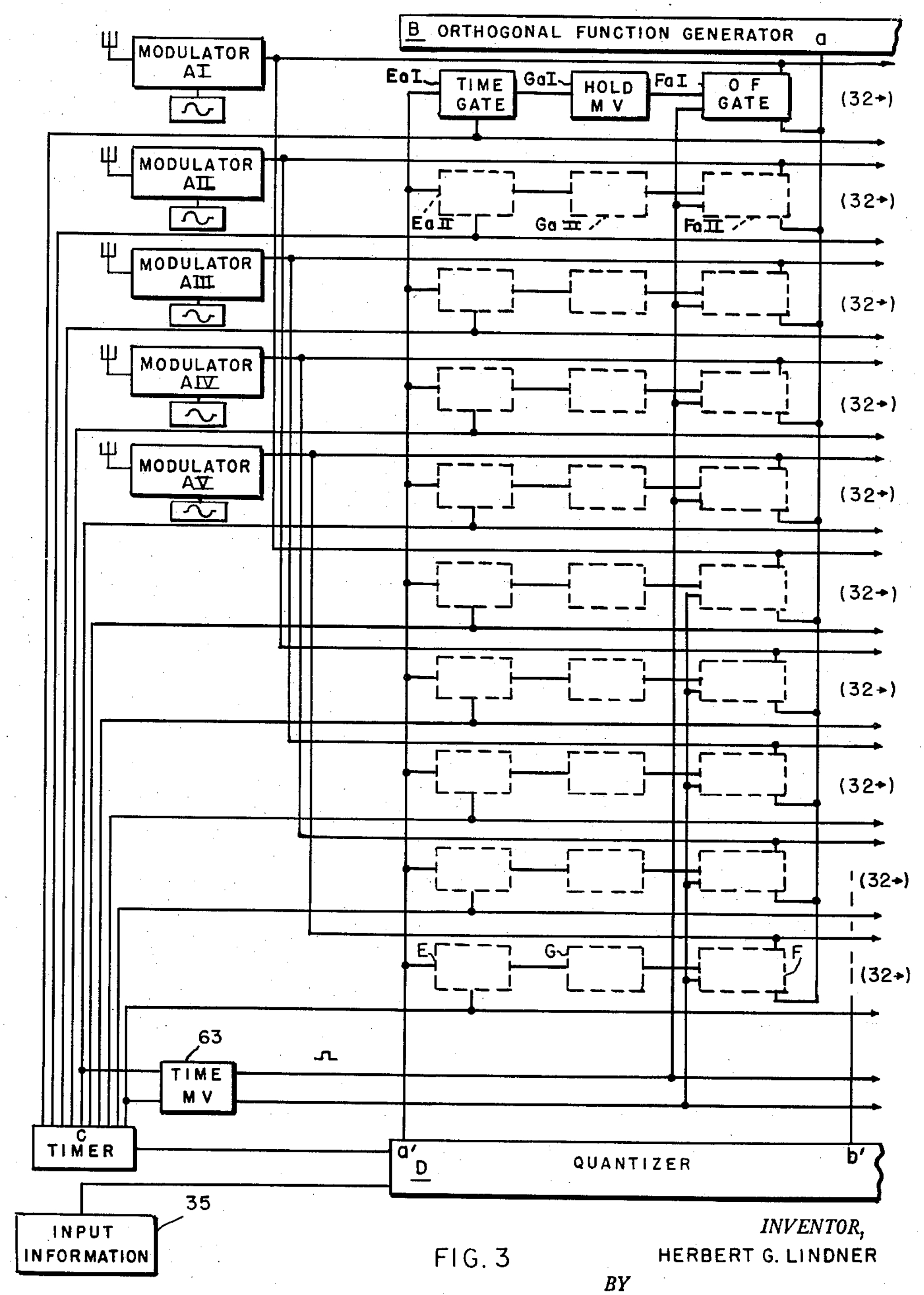
FIG. 3 illustrates a more complete transmitter system.

FIG. 3 illustrates a somewhat more complete system than is shown in FIG. 1 but for the most part will be found to be analogous thereto. The input information source 35 is again connected to amplitude quantizer D which may include a plurality of quantizing tubes and output tubes as in FIG. 1 to provide outputs corresponding to the amplitude of the input information. Time gates E controlled by various outputs of the timer unit C are used to control the operation of hold multivibrators G. In this case the timer is shown as having 10 output circuits in order that the hold multivibrators G may be used to store up the amplitude readings during certain intervals and utilize such readings during later intervals. The output of these multivibrator circuits is used in conjunction with the output of a time multivibrator 63 to open the gates F which are used to supply the respective orthogonal functions from the generator B to the balanced modulators A of the transmitter system to permit the amplitude readings stored up during the first five sample times to be transmitted during the time from the fifth to the tenth sample time and to permit the amplitudes stored on the multivibrators during the sixth to tenth sample times to be transmitted during the interval between the tenth sample time and the fifth sample time of the next group.

In this circuit it will now be apparent that the amplitude of the input information is quantized in the amplitude quantizer D, admitted at the proper times thru the quantizing gates E*a*I, E*a*II, etc. to be stored on the respective hold multivibrators G*a*I, G*a*II, etc. so that the proper orthogonal function can be admitted thru the gates F*a*I, F*a*II, etc. to be applied to the balanced modulators when the time multivibrator 63 also applies the proper voltage. The operations of the various circuits are sufficiently separated in time so that each circuit is restored to normal condition before it can be utilized over again for storing a similar or different indication of the input information.

FIG. 4 is substantially equivalent in design and operation to FIG. 3 except that additional modulator gates 65I, 65II, etc. in the leads from the orthogonal function gates to the balanced modulators are used and the gates F*a*I, F*a*II, etc. are simplified by omitting the inputs from the time multivibrator 63 and using these to control the modulator gates of FIG. 4. The apparent complication resulting from the addition of modulator gates 65I, 65II, etc. is more apparent than actual since the simplification of a large number of (160) orthogonal function gates F*a*I, F*a*II, etc., used to control the outputs of the orthogonal function general B and previously designed to utilize the double gating inputs, usually would more than compensate for the addition of only ten simple gating circuits as used in FIG. 4.

Figure 5:
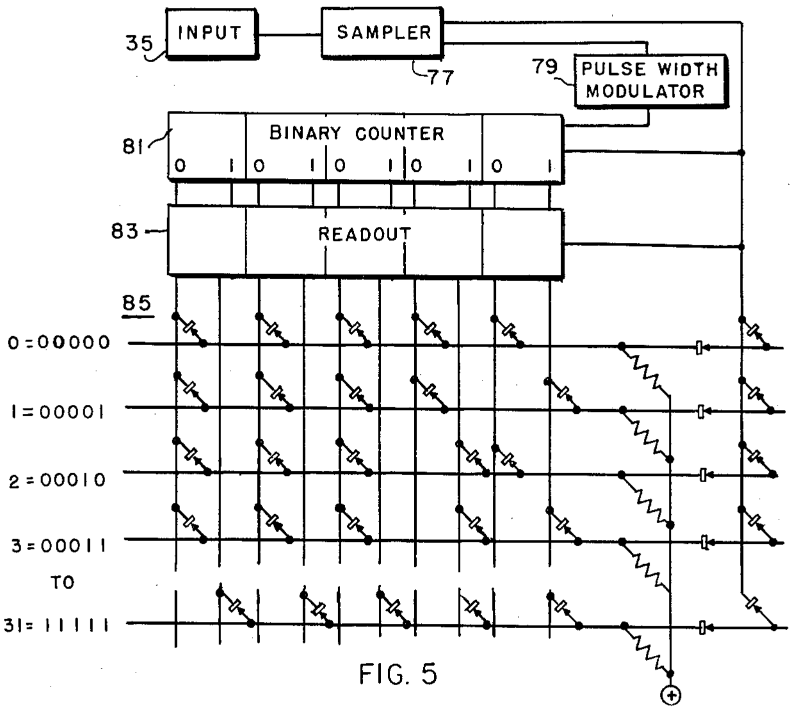
FIG. 5 illustrates a suitable quantizing circuit for use in the system of FIG. 3.

In place of the amplitude quantizer D illustrated in FIG. 1, it is usually more practical to use a pulse code modulation system with a decoding matrix as illustrated in FIG. 5. Altho the operation of such a circuit is somewhat more difficult to describe because of the many conversions involved, the actual circuitry may be simpler and more reliable than that illustrated in FIG. 1. In this circuit the input information is supplied to a sampler 77 in which it is sampled rapidly to produce a signal involving pulse amplitude modulation. This signal is then supplied to a pulse width modulator 79 and utilized to operate a binary counter circuit 81 providing an output corresponding to the width of the signals from the pulse width modulator. The readings of the binary counter at the end of each count are supplied thru a read-out circuit 83 to control a matrix circuit 85 having thirty-two outputs, each of which is peculiarly sensitive to only one combination of outputs of the counter circuit. A timing output from the sampler 77 is used to control the readout circuit and also to operate the proper output of the matrix. Such pulse code modulation and matrix systems are already well known in the art.

Figure 6:
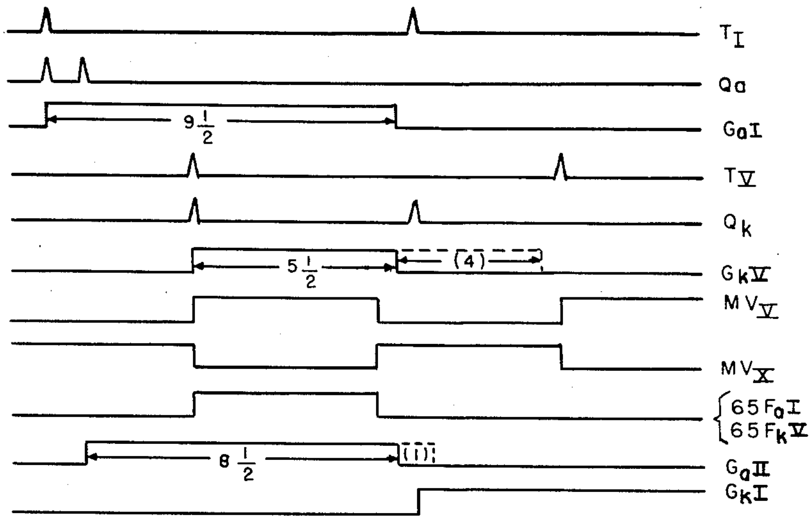
FIG. 6 illustrates a few typical waveforms in the operation of FIG. 3, used for purpose of explanation.

FIG. 6 illustrates a typical series of waveforms which might occur during the operation of this invention as embodied in FIGS. 3 and 4. The line $T_I$ illustrates typical timing pulses on the first timer output lead. The line Q*a* illustrates a condition in which the amplitude quantizer output for an amplitude *a* occurs at the first timing pulse and also at the second timing pulse. (In the case of FIG. 1 since the amplitude quantizer includes no timer input connection there would not be two separate pulses.) The line G*a*I illustrates the time of operation of the multivibrator G*a*I corresponding to the amplitude *a* occurring at the time I and should last approximately 9½ sample periods. The line $T_V$ corresponds to the output from the fifth lead to the timer C and as in the case of the first waveform line it will be seen that the pulses occur at the fifth time of each group of ten samples. The line Q*k* illustrates a condition in which the amplitude quantizer output for an amplitude *k* occurs at the fifth timing pulse and also at the first timing pulse of the next group of pulses. The line G*k*V illustrates the time of operation of the multivibrator G*k*V corresponding to the amplitude *k* occuring at the time V and need last only about 5½ sample periods. The line $MV_V$ represents one output of the multivibrator 63 which is used to open the proper gates 65I to 65V during the fifth to tenth sample pulses and also may be considered as representing the actual operation of such gates. Similarly line $MV_V$ represents the other output to open the proper gates 65VI to 65X during the tenth to the succeeding fifth pulses. The combined effect of $MV_V$ and of G*a*I or G*k*V is also illustrated in the waveform marked 65F*a*I and 65F*k*V.

In the case of FIG. 3 these combined effects are actually accomplished in the double gates F*a*I, F*a*II, etc. as the modulator gates 65*a*I, 65*a*II, etc. are not included in FIG. 3. The line $MV_X$ merely represents the inverse of $MV_V$ from the other output of time multivibrator 63 and is used to open the other gates 65*a*VI to 65*a*X for transmission of the sixth to tenth sample during the tenth sample to the fifth sample of the subsequent group. From the time relations indicated it will be apparent that 9½ sample periods would be a sufficient time for operation of any of the multivibrators and even 5½ sample periods would be enough in the case of the fifth group. To illustrate the interrelations with other elements of the system the level *a* quantizer output is also illustrated at the second sample and the level *k* quantizer output at the first sample of the next group of ten. The results of these pulses are indicated by waveforms G*a*II and G*k*I and the combined effect (not shown) on the modulators would be analogous to that described above, the effect of G*a*II occurring simultaneously with those discussed above, and that of G*k*I occurring 10 sample periods later.

FIG. 7 illustrates a more complete receiver system generally similar to that shown in FIG. 2. As illustrated, the incoming signal enters a wide band amplifier 71 and is supplied therefrom to various balanced modulators or receiver multipliers A′*a*I, A′*b*I, A′*a*II, etc. The other inputs to receiver multipliers are supplied by orthogonal function generator B′. When the received signal for any particular suppressed carrier corresponds to the particular orthogonal function, the output of the receiver multiplier would include a strong signal component corresponding to the carrier which had been suppressed at the receiver. A filter and detector in each of the various receiver multipliers therefore provides a substantial signal output corresponding to the particular orthogonal function transmitted over the corresponding carrier. When this strong signal occurs, it is utilized to open the gate circuit F′*a*I, F′*b*I, F′*a*II, etc. which applies a voltage pulse corresponding to the original signal amplitude in the transmitter to the output circuit of the receiver, which is a low pass filter of cutoff frequency equal to the highest frequency of the speech wave, at the proper instant of time determined by the output of the timer C′.

The information output circuit of FIGS. 2 and 7, and also FIG. 8 discussed below, would normally include an ideal low pass filter of a bandwidth from zero to one half the sampling frequency. The various amplitude pulses are applied by the system previously described in proper time sequence to represent the desired information and would therefore appear as a voltage, in this case direct current voltage, pulse amplitude modulated having a strong component at the sampling frequency of no information value. The filter eliminates high frequency components to provide an actual output corresponding substantially to the input information in the transmitter except that frequency components above one half the sampling frequency are eliminated.

FIG. 8 is a somewhat different variation of the receiver circuit in which the suppressed carrier is reinserted into the incoming signal at the receiver to reestablish the orthogonal function as it had been supplied to the transmitter. These orthogonal functions may be analyzed as either coded series of pulses or coded continuous complex waves. The same decoding could be used in either case but the coded pulse analysis is more readily illustrated and is therefore used for purpose of the description of FIG. 8 below.

The analysis of the operation may be conveniently approached by reference to FIG. 1 of application Serial No. 590,999 copied herein as FIG. 9. In the transmitter circuit 111 of this particular figure a pulse 119 is used as the input to a delay line 121 having a plurality of output leads 123*a* to *m*. Amplitude attenuators in each of these outputs are adjustable to provide a complex wave corresponding to the combination of the pulse outputs of pulser 119 from the various outputs of the delay line and the attenuators connected thereto. By the use of several sets of attenuators arranged as a matrix it will be apparent that several different complex waves can be derived from the same delay line 121. This type function generator is not per se fundamentally new, for example, in Bedford Patent No. 2,401,403 a closely similar device is used to generate various complex functions according to the settings of the switches (crudely analogous to applicant's attenuators); in that case there is no reference to orthogonality as there is only one function at a time and it is utilized as a scrambler for the actual speech wave, not as a sample coder. Other forms of function generator also might be used, such as that shown by Korn and Korn, Electronic Analog Computers, 2d ed., 1956, starting page 284. It will be realized that the generators have no radical structural difference over various known function generators suited to the frequency range involved; it is only necessary that each generator be adjusted to produce the particular orthogonal function determined by the mathematical analysis, highly complex but well understood to those in the field. As shown in FIG. 9 the receiver circuit 131 also includes an identical circuit for producing the same type of complex wave. This is combined with the received signal in the receiver multiplier 137 and therefore provides a strong signal at the frequency of the carrier which had been suppressed in the transmitter system 111; this carrier is recognized in the narrow band filter 133.

Figure 9A:
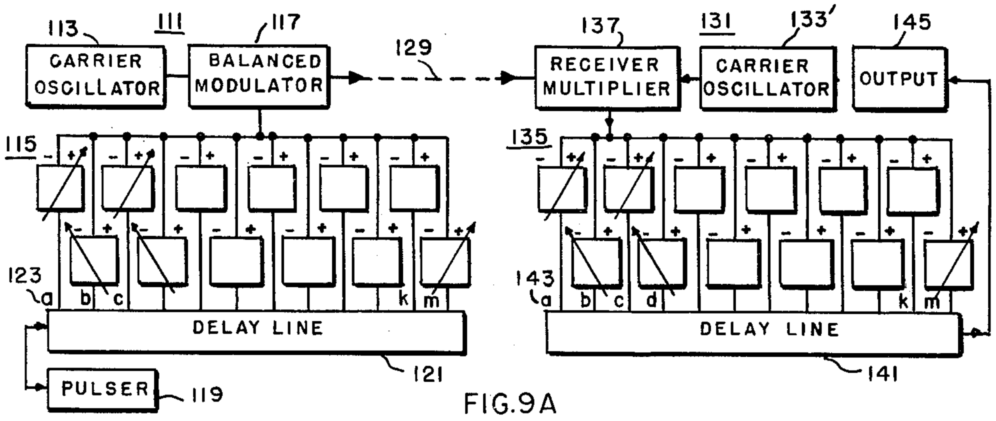

However, if the received signal and a carrier identical to that suppressed in the transmitter were used in the receiver-multiplier as shown in FIG. 9A the result would be to reproduce the complex wave in the receiver-multiplier output. This could then be fed in the opposite direction thru the attenuators into the delay line 141, and at the end of the delay line 145 opposite to that at which the pulser 139 had been connected a strong pulse output would be provided corresponding to each pulse supplied by the pulser 119 of the transmitter circuit. It will be apparent that the reconstructed pulses would be delayed by a time corresponding to the total delay in either of the equal delay lines 121 or 141 plus any delays in transmission channel 129. Such an arrangement would require that the attenuators be reversed in the receiver system, but the effect of the complementary delays in the receiver system corresponding to each delay in the transmitter system is readily apparent. The operation of these complementary filters can be considered from the standpoint that a pulse supplied to the transmitter system delay line will come out the various taps and back into the corresponding taps of the receiver delay line so that each such pulse is exactly synchronized in the output of the receiver delay line. The pulse will also arrive at the output of the receiver delay line at a great many but entirely random times and will not contribute to the output.

Figure 9B:
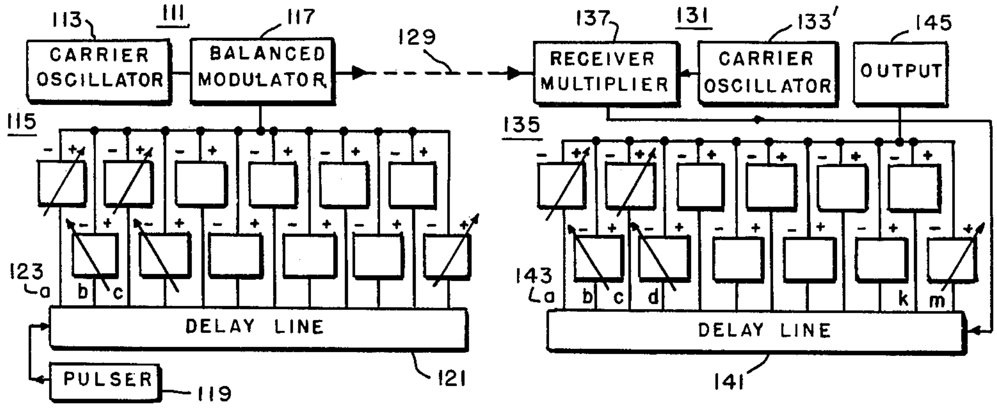

As illustrated by FIG. 9B the same result would be obtained if the complex waveform were supplied to the delay line at the end 145 previously used as the output end, and the terminal used in FIG. 9A as the input to the attenuator and delay line system were used as the output. This rearrangement of the delay line is particularly helpful if more than one complex waveform is to be recognized, since a single delay line may be used to supply a large number of attenuator networks in the form of a matrix as in the transmitter system just discussed. The restored orthogonal function is supplied thru a delay circuit having a plurality of outputs to a matrix which can recognize any particular orthogonal function.

The delay line and amplifiers also can be analyzed as a filter, and an equivalent filter circuit could be made using conventional filter elements. In the invention as disclosed herein the receiver actually multiplies the received noise function by a stored noise function, actively energized. In the case of the conventional filter the unit impulse response would have to be fully analyzed and the complementary filter designed from this. Such passive network systems do not require any synchronization of the complex waveform circuits, but as noted above (in the fifth paragraph) the carrier oscillator would require synchronization.

The application of such a technique is illustrated more fully in FIG. 8 in which the locally supplied carrier from oscillator 73'I, 73'II etc. (synchronized to the transmitter carrier) and received signals are combined in the multiplier and detector A'I, A'II, etc. to provide the restored orthogonal noise functions. These are then supplied to the delay line 91I, 91II, etc. and to the matrix 93I, 93II, etc. used to identify the various individual functions. The output of such matrix is then utilized to open appropriate amplitude gates F'*a*I, F'*b*I, F'*a*II, etc. the same as in FIG. 7. Such a system is particularly effective when there is a single carrier and a plurality of orthogonal functions. However, it is also suitable for several carriers if a similar balanced modulator, delay, matrix, and gates are used for each of the various carriers as shown in FIG. 8.

Elementary forms of the invention and typical applications to a complex system have been described to facilitate an understanding of the invention, but many further variations will be apparent to those skilled in the art.

What is claimed is:

1. A system of security communication comprising a source of information of variable amplitude, timer means having a plurality of output leads sequentially energized resulting in sampling intervals between such sequential energizations, quantizing means responsive to both the energization of said timer output leads and the amplitude of said information, means responsive to said quantizing means to open gating circuits corresponding to the time of said energizations and to said amplitude for a period equal to a plurality of said sampling intervals, a plurality of balanced modulators corresponding to said plurality of sampling intervals each supplied by a carrier, and a source of a plurality of orthogonal noise functions, one corresponding to each of the amplitudes determined by said quantizing means, said gating circuits applying said respective functions to said respective modulators in accordance with the time and amplitude of the various samples of said input signal.

2. A system of security communication comprising a source of information of variable amplitude, timer means having a plurality of output leads sequentially energized resulting in sampling intervals between such sequential energizations, quantizing means responsive to both the energization of said timer output leads and the amplitude of said information, means responsive to said quantizing means to open gating circuits corresponding to the time of said energizations and to said amplitude for a period equal to a plurality of said sampling intervals, a plurality of balanced modulators corresponding to said plurality of sampling intervals each supplied by a carrier, and a source of a plurality of orthogonal noise functions, one corresponding to each of the amplitudes determined by said quantizing means, said carriers and functions comprising two discrete types of control signals, said gating circuits applying said respective functions to said respective modulators in accordance with the time and amplitude of the various samples of said input signal, and a receiver comprising a generator of synchronized identical control signals of one type, receiver multipliers combining said control signals with the received signals to restore the control signals of the other type, and a plurality of gates controlled by said restored control signals to apply voltages corresponding to the quantized voltage samples of the transmitter to an input circuit, providing a restored version of the information from said source.

3. A system of security communication comprising a source of information of variable amplitude, timer means having a plurality of output leads sequentially energized resulting in sampling intervals between such sequential energizations, quantizing means responsive to both the energization of said timer output leads and the amplitude of said information, means responsive to said quantizing means to open gating circuits corresponding to the time of said energizations and to said amplitude for a period equal to a plurality of said sampling intervals, a plurality of balanced modulators corresponding to said plurality of sampling intervals each supplied by a carrier, and a source of a plurality of orthogonal noise functions, one corresponding to each of the amplitudes determined by said quantizing means, said gating circuits applying said respective functions to said respective modulators in accordance with the time and amplitude of the various samples of said input signal, and a receiver comprising a generator of sychronized identical functions, receiver multipliers combining said functions with the received signals to restore the carrier suppressed by the balanced modulators, and a plurality of gates controlled by said restored carriers to apply voltages corresponding to the quantized voltage samples of the transmitter to an input circuit, providing a restored version of the information from said source.

4. A system of security communication comprising a source of information of variable amplitude, timer means having a plurality of output leads sequentially energized resulting in sampling intervals between such sequential energizations, quantizing means responsive to both the energization of said timer output leads and the amplitude of said information, means responsive to said quantizing means to open gating circuits corresponding to the time of said energizations and to said amplitude for a period equal to a plurality of said sampling intervals, a plurality of balanced modulators corresponding to said plurality of sampling intervals each supplied by a carrier, and a source of a plurality of orthogonal noise functions, one corresponding to each of the amplitudes determined by said quantizing means, said gating circuits applying said respective functions to said respective modulators in accordance with the time and amplitude of the various samples of said input signal, and a receiver comprising a source of synchronized identical carriers, receiver multipliers combining said carriers with the received signals to restore the functions, decoder means to identify the various functions, and a plurality of gates controlled by said decoder means to apply voltages corresponding to the quantized voltage samples of the transmitter to an output circuit, providing a restored version of the information from said source.

References Cited in the file of this patent

UNITED STATES PATENTS

| | | |
|---|---|---|
| 2,521,690 | Clark | Sept. 12, 1950 |
| 2,580,148 | Wirkler | Dec. 25, 1951 |
| 2,603,714 | Meacham | July 15, 1952 |
| 2,658,189 | Lovell | Nov. 3, 1953 |
| 2,777,897 | Gretener | Jan. 15, 1957 |